Oct. 3, 1939.  G. J. BLISS  2,174,816
WINDSHIELD DEFROSTER
Filed Feb. 1, 1938
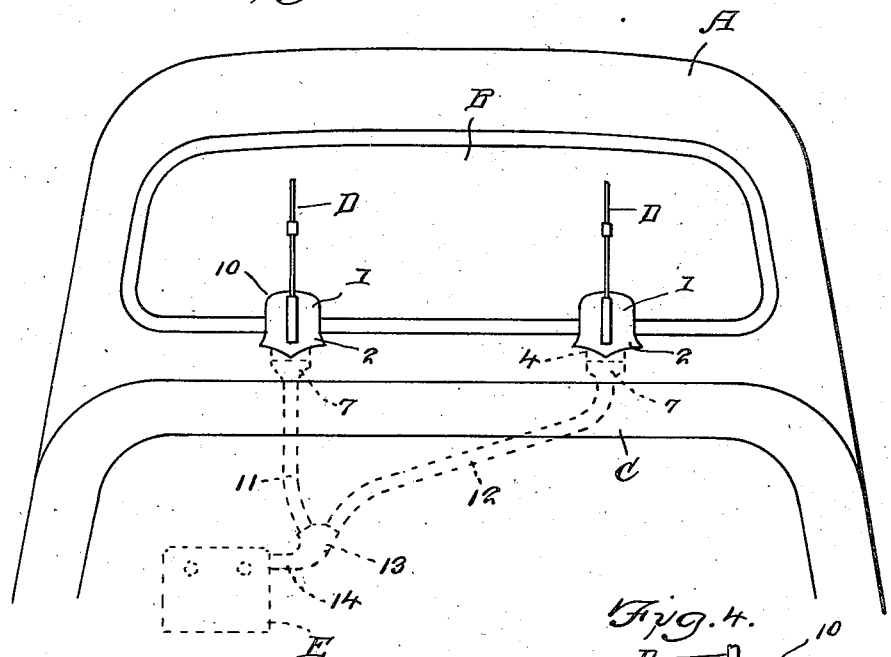
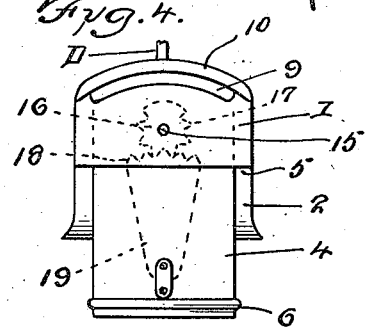
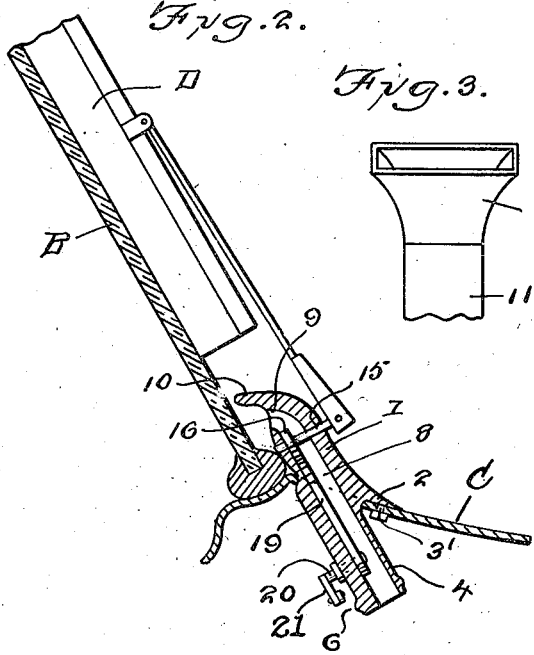
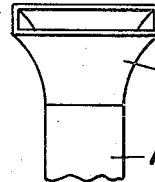
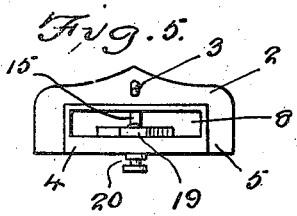
George J. Bliss
INVENTOR
BY Victor J. Evans & Co.
ATTORNEYS Patented Oct. 3, 1939

2,174,816

UNITED STATES PATENT OFFICE 2,174,816

WINDSHIELD DEFROSTER

George J. Bliss, Pittsburgh, Pa.

Application February 1, 1938, Serial No. 188,174

2 Claims. (Cl. 15—250)

This invention relates to windshield defrosters, and its general object is to provide a built in defroster for motor vehicle windshields, that directs heated air against the outside of the windshield for direct application to any formation of ice or accumulation of snow, or the like thereon, with the result the ice, snow or the like will be readily melted and with greater expediency than by the use of defrosters now generally employed, which are arranged within the vehicle adjacent to the windshield, and are therefore more or less ineffective for the purpose intended.

A further object is to provide a windshield defroster that includes hooded nozzles which are preferably secured to the cowl of the vehicle in close proximity to the windshield, for confining and directing a blast of heated air against the same, and for cooperation with the windshield wipers for removing the frozen matter from the windshield.

Another object is to provide a windshield defroster that includes nozzles having conduits for connection thereof with heating means, such as a hot water heater, or the like.

A still further object is to provide a windshield defroster that includes nozzles which not only direct air for the purpose set forth, but also harmonize with the general streamline effect of vehicles now in general use, and the defroster is easy to install, inexpensive to manufacture, simple in construction and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view illustrating the application of the defroster which forms the subject matter of the present invention, to a motor vehicle.

Figure 2 is a view partly in section and illustrates the arrangement of a defroster nozzle with respect to a windshield wiper, with the latter having a portion of its operating means mounted in the nozzle housing and including shafts extending therethrough.

Figure 3 is a fragmentary view of one of the conduits and the outlet end thereof for connection with a housing of one of the nozzles of my defroster.

Figure 4 is a view of a nozzle looking toward the outlet face thereof.

Figure 5 is a bottom plan view of the nozzle.

Referring to the drawing in detail, the letter A indicates a motor vehicle body, B the windshield thereof, C the cowl, D the windshield wipers, and E a hot air heater for supplying heated air for passage through the nozzles for the latter to direct the same against the windshield.

It will be noted that I have illustrated a defroster that includes a pair of nozzles, but a single nozzle may be employed, as will be apparent. In any event, each of the nozzles includes an elongated substantially rectangular shaped housing 1 having a downwardly and forwardly inclined extension 2 formed thereon for fitting association with the cowl C, as best shown in Figures 1 and 2, and the extension terminates in a substantially V-shaped forward end, that has a threaded stud 3 extending therefrom for passage through the cowl, and held accordingly by a nut 3', for securing the nozzle to the cowl.

The housing 1 is of course hollow and from the juncture of the extension 2 therewith, the housing is reduced as at 4 to provide lateral shoulders 5 that rest upon the cowl, and the reduced portion 4 extends through the cowl for disposal below the same, as clearly shown in Figure 2. Formed on and surrounding the reduced portion 4 adjacent its lower end, is a bead 6 that provides a stop collar for the outlet end or mouth 7 of a conduit for connecting the nozzle in communication with a suitable source of heat, such as the hot air heater E as shown in Figure 1.

The shape of the housing provides an elongated passageway 8 therethrough and which is provided with an arcuate outlet 9 at the upper end thereof. Rising from the body of the housing is an arcuate hood 10 which is disposed over the outlet and provides deflecting means for directing the heated air from the outlet toward the windshield as will be apparent upon inspection of Figure 2.

In view of the fact that the nozzles are shown in pairs, branch conduits 11 and 12 are provided therefor, and the branch conduits are connected to a Y-coupling 13 which in turn is connected to the heater E by a conduit 14.

It will be further noted, as best shown in Figure 2, that an operating shaft 15 of the windshield wiper bridges the passageway and extends through the body or upper portion of the housing of the nozzle, so that the windshield wiper will be disposed in close association with the outlet end of the nozzle, and fixed on the shaft 15 is a segmental gear 16 having teeth 17 which mesh with the teeth 18 of an elongated substantially triangular shaped gear member 19 which together with the gear 16 is disposed within the passageway 8. The gear 19 has its lower end fixed to a shaft 20 that extends through the inner wall of the lower or inner reduced portion 4 and the outer end of the shaft 20 has connected thereto an arm 21 for connection to the remaining portion of the operating means for the wiper, not shown.

The cowl C is of course slotted for receiving the reduced portion 4 therethrough, for disposing the extension 2 and shoulders of the nozzle in fitting association with the cowl, and it will be noted particularly from Figure 2 that the outer face of the nozzle is shaped on a reverse curve, to give a streamline appearance, so as to harmonize with the general streamline effect of the body of vehicles now in general use.

From the above description and disclosure in the drawing, it will be obvious that the nozzles cooperate with the windshield wipers, in retaining the windshield free from frozen matter, such as snow, ice and the like and that the frozen matter is melted by the heated air and will be either removed by the melting process or by the windshield wipers, when sufficient melting action has taken place, consequently clear vision will be provided.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A vehicle windshield defroster comprising a nozzle having a passageway therethrough, means for mounting and securing the nozzle to the cowl of the vehicle, means included on the nozzle for disposal through the cowl and adapted for connection with a source of heated air for disposal of the latter through the passageway, windshield wiper operating means including a shaft journaled in and extending transversely through the nozzle for attachment of the operating arm of a wiper blade thereto, and a hood for the outlet end of the passageway for directing the air therefrom toward the windshield in close proximity to the wiper blade to cooperate therewith for defrosting the windshield.

2. A vehicle windshield defroster comprising a nozzle including a body, a reduced portion depending from the body for disposal through the cowl of the windshield and providing a shoulder to rest upon the cowl, means for securing the nozzle to the cowl, said body and reduced portion having a passageway therethrough with the outlet of the passageway opening through the upper end of the body, said reduced portion being adapted for connection with a source of heated air for disposal of the latter through the passageway, windshield wiper operating means including a shaft mounted for oscillation in and extending through the body for attachment of the arm of a wiper blade thereto, a hood rising from the body and overlying the outlet for directing the heated air to the windshield in close proximity to the wiper blade to cooperate therewith for defrosting the windshield.

GEORGE J. BLISS.